US012716277B2

(12) United States Patent
Wu

(10) Patent No.: US 12,716,277 B2
(45) Date of Patent: Aug. 25, 2026

(54) LOCKING STRUCTURE FOR CARRIAGE COVER

(71) Applicant: Hongbo Wu, Ningbo (CN)

(72) Inventor: Hongbo Wu, Ningbo (CN)

(73) Assignee: Hongbo Wu, Ningbo (CN)

( * ) Notice: Subject to any disclaimer, the term of this patent is extended or adjusted under 35 U.S.C. 154(b) by 125 days.

(21) Appl. No.: 18/327,326

(22) Filed: Jun. 1, 2023

(65) Prior Publication Data

US 2024/0018812 A1 Jan. 18, 2024

(30) Foreign Application Priority Data

Jul. 13, 2022 (CN) ........................ 202210827281.2

(51) Int. Cl.

*E05C 9/04* (2006.01)
*E05C 9/22* (2006.01)

(52) U.S. Cl.

CPC ................ *E05C 9/041* (2013.01); *E05C 9/22* (2013.01)

(58) Field of Classification Search

CPC . E05C 9/041; E05C 9/22; E05C 9/833; E05C 9/12; E05B 53/003; E05B 65/006; E05B 85/00; E05B 83/02; E05B 83/22; Y10T 292/0839; Y10T 292/0834; Y10T 292/0993; Y10T 292/1018; Y10S 292/11; Y10S 292/12; B60J 7/041; B60J 7/141; B60J 7/1621; B60J 7/1851; B60J 7/1853; B60J 7/198

USPC ............... 296/100.04, 100.07, 100.16, 100.1

See application file for complete search history.

(56) References Cited

U.S. PATENT DOCUMENTS 1,376,233 A * 4/1921 Swan ...................... E05C 9/041 292/39
1,536,773 A * 5/1925 Ciaccio ................... B60R 25/04 70/240
2,261,353 A * 11/1941 Fedele .................... E05C 9/041 70/120

(Continued)

FOREIGN PATENT DOCUMENTS

CN 102774313 B * 3/2014 ........... B60J 7/1607
CN 211416922 U * 9/2020 .............. B60J 7/104

(Continued)

OTHER PUBLICATIONS

KR20180006213 Espacenet machine translation claims and description (Year: 2024).*

*Primary Examiner* — Steven A Tullia
(74) *Attorney, Agent, or Firm* — Quarles & Brady LLP

(57) ABSTRACT

The present invention discloses a locking structure for a carriage cover. The carriage cover includes at least two foldable cover panels. The locking structure is fixed to the bottom of the cover panel through a mounting base. The locking structure comprises a gear rotatably mounted on the mounting base, a sliding plate slidably mounted on the mounting base, and a latch slidably mounted on the bottom of the cover panel, the sliding plate being engaged with the gear via toothed portion on its inner side and the latch being connected to the sliding plate via a first connecting piece. The latch has a locked state to extend into carriage frame to limit the folding of the cover panel, and an unlocked state to retract the lock tongue into the mounting base. This increases the stability of the carriage cover in its expanded state and convenience of operation.

20 Claims, 10 Drawing Sheets

(56) References Cited

U.S. PATENT DOCUMENTS

| | | | | | |
|---|---|---|---|---|---|
| 4,015,454 | A * | 4/1977 | Struble | E05C 9/048 70/2 |
| 4,476,700 | A * | 10/1984 | King | E05C 9/047 70/120 |
| 4,616,864 | A * | 10/1986 | Douglas | E05C 9/046 292/336.3 |
| 4,962,652 | A * | 10/1990 | Schneider | E05C 9/041 70/120 |
| 5,509,703 | A * | 4/1996 | Lau | E05C 9/041 292/336.3 |
| 5,683,122 | A * | 11/1997 | Lee | E02D 29/1427 70/168 |
| 5,709,111 | A * | 1/1998 | Henao | E05B 15/108 70/120 |
| 5,826,922 | A * | 10/1998 | Wernig | E05C 9/041 292/172 |
| 6,250,728 | B1 * | 6/2001 | Thorp | A47B 51/00 312/247 |
| 6,607,221 | B1 * | 8/2003 | Elliott | E05C 9/043 49/446 |
| 6,682,109 | B2 * | 1/2004 | Horne | E05C 1/10 292/22 |
| 7,322,619 | B2 * | 1/2008 | Nolte | E05B 65/087 49/185 |
| 7,421,868 | B2 * | 9/2008 | Matyko | E05C 9/047 70/201 |
| 7,523,975 | B2 * | 4/2009 | Chaloupka | E05B 83/32 220/264 |
| 9,828,073 | B1 * | 11/2017 | Cifers, III | B60R 11/00 |
| 10,358,849 | B2 * | 7/2019 | Glover | E05B 17/10 |
| 10,406,899 | B2 * | 9/2019 | Carter | B60J 7/198 |
| 11,071,227 | B2 * | 7/2021 | Hennrich | H05K 7/16 |
| 11,097,605 | B2 * | 8/2021 | Mahler | B62D 33/046 |
| 11,629,533 | B2 * | 4/2023 | Schroll | E05B 63/0073 292/137 |
| 2012/0274091 | A1 * | 11/2012 | Yue | B60J 7/141 296/100.04 |
| 2020/0108702 | A1 * | 4/2020 | Dylweski, II | B60J 7/198 |
| 2021/0129646 | A1 * | 5/2021 | Mcdonald, II | E05C 9/046 |
| 2021/0324667 | A1 * | 10/2021 | Grillo | E05C 19/003 |

FOREIGN PATENT DOCUMENTS

| | | | | | |
|---|---|---|---|---|---|
| CN | 215859588 | U | * | 2/2022 | |
| CN | 114458107 | A | * | 5/2022 | E05B 85/22 |
| CN | 114482729 | A | * | 5/2022 | E05B 83/02 |
| DE | 10228399 | A1 | * | 1/2004 | B60R 7/04 |
| EP | 1172508 | A1 | * | 1/2002 | E05C 1/10 |
| EP | 2017415 | A2 | * | 1/2009 | E05C 9/041 |
| FR | 2797238 | A1 | * | 2/2001 | E05B 63/128 |
| GB | 2338507 | A | * | 12/1999 | E05B 47/0603 |
| KR | 20140013655 | A | * | 2/2014 | E05C 1/10 |
| KR | 20180006213 | A | * | 1/2018 | E05B 1/003 |
| KR | 20180038172 | A | * | 4/2018 | E05C 19/063 |
| KR | 20180110404 | A | * | 10/2018 | E05C 9/041 |
| KR | 20200001658 | U | * | 7/2020 | E05C 9/041 |
| WO | WO-2018161181 | A1 | * | 9/2018 | E05C 9/043 |

* cited by examiner

LOCKING STRUCTURE FOR CARRIAGE COVER

CROSS-REFERENCES TO RELATED APPLICATIONS

The present application claims priority to China Patent Application No. 202210827281.2 (Chinese Patent No.: 115182653 A), entitled "A Locking Structure For Carriage Cover", filed Jul. 13, 2022, which is common own and incorporated by reference herein for all purposes.

BACKGROUND OF THE INVENTION

The present invention relates to the technical field of vehicle carriage equipment, specifically, a locking structure for carriage cover panels.

Currently, car models with open carriages require an adjustable cover assembly to protect and cover the cargo inside the carriage. The cover assembly usually includes multiple movable cover panels hinged together that can be folded to open the carriage or deployed flat in a covering state. During driving, the vehicle inevitably experiences bumps, so a locking structure must be set up between the cover panel and the frame. In the existing technology, one type of locking structure is implemented by setting up latches on both sides of the cover panel. Each lock tongue requires an operating structure, which results in higher costs. Furthermore, this type of operating mechanism lacks cushioning for the reset action of the latch when re-locking. The latch reset motion is too fast, and the feedback at the operating end is too strong for the hand, affecting operation.

BRIEF SUMMARY OF THE INVENTION

The present invention is directed to an apparatus with a locking structure for a movable cover of a vehicle carriage or open-type trunk. In a specific embodiment, the locking structure includes a gear rotatably mounted on a mounting base at the bottom of the cover panel, a sliding plate slidably mounted on the mounting base, and a latch slidably mounted on the bottom of the cover panel, the sliding plate being engaged with the gear via toothed portion on its inner side and the latch being connected to the sliding plate via a first connecting piece. There are other embodiments as well.

One general aspect of the present disclosure includes a locking structure for locking a cover panel to a carriage side frame. The locking structure also includes a mounting base fixed to bottom surface of the cover panel. The structure also includes a gear rotatably arranged on the mounting base. The structure also includes a sliding plate slidably arranged on the mounting base, the sliding plate may include an inner opening with a side edge having a toothed portion engaged with the gear. The structure also includes a latch slidably arranged to an end region of the mounting base and connected to the sliding plate, the latch may include a locking state stretching out of the end region to lock the cover panel to the carriage side frame and an unlocking state retracting back to the mounting base by the sliding motion of the sliding plate driven by the gear.

Implementations may include one or more of the following features. The locking structure where the mounting base may include a base cover with a center hole to allow an end section of the gear being extended out in a vertical direction of the mounting base and a guiding channel to allow the sliding plate to move linearly along a longitudinal direction of the mounting base with limitations to vertical or transverse motions. The locking structure may include a handle having inner threads configured to screw onto the end section of the gear that is extended out of the base cover. The locking structure may include a positioning shaft fixed to the mounting base, the positioning shaft fixing the handle and being sleeved by a torsion spring and inserted to the gear, the torsion spring may include a free end axially inserted into the gear and a fixed end connected to the positioning shaft.

Implementations may also include one or more of the following features. The latch may include a lock case may include an inner cavity with an open end and a stop end, the inner cavity matching outer contour of the latch for facilitating sliding motion of the latch between the locking state and the unlocking state. The latch may include a locking end to stretch out of the open end of the lock case in the locking state to limit the cover panel to the carriage side frame and retract fully into the lock case in the unlocking state to allow the cover panel being flipped up. The locking end may include a guiding surface configured to be pressed against the carriage side frame to push the locking end back to the lock case as the cover panel is being deployed, the locking end stretching out of the lock case again by a resetting force from the spring after the cover panel is fully laid flat on the carriage side frame. The latch may include a movable part connected to the locking end, the movable part being sleeved by a spring that abuts against the locking end and the stop end, the movable part pushing the locking end out of the open end of the lock case by a resetting force of the spring and pulling the locking end back in the lock case by compressing the spring. The latch may include a connecting end located outside of the lock case, the connecting end being prevented from moving towards the open end of the lock case by the stop end in the locking state and being configured to retract the locking end back to the lock case in the unlocking state. The locking structure may include a connector connecting the connecting end to the sliding plate to provide a pulling force to retract the locking end as the gear is rotated to cause a linear motion of the sliding plate.

Another general aspect of the present disclosure includes a locking structure for locking a cover panel to two carriage side frames. The locking structure also includes a mounting base fixed at bottom of the cover panel, the mounting base may include a length from a first end to a second end across a width of the cover panel from a first side edge to a second side edge thereof. The structure also includes a gear rotatably arranged near a middle region of the mounting base. The structure also includes a first sliding plate slidably arranged on the mounting base, the first sliding plate may include an inner opening with a side edge having a first toothed portion engaged with the gear. The structure also includes a second sliding plate slidably arranged on the mounting base, the second sliding plate may include an inner opening with a side edge having a second toothed portion engaged with the gear, the second sliding plate being partially stacked over the first sliding plate and the second tooth portion being located near opposite edges of the mounting base. The structure also includes a first latch slidably arranged at the first end of the mounting base and connected to the first sliding plate. The structure also includes a second latch slidably arranged at the second end of the mounting base and connected to the second sliding plate. The structure also includes where the first latch and the second latch may include a locking state where the first latch stretches out of the first end and the second latch stretches out the second end to lock the first side edge and the second side edge of the cover panel respectively to the two carriage side frames, and an unlocking state where both the first latch and the second latch are retracted back to the mounting base by linear motion in opposite directions of the first sliding plate and the second sliding plate driven simultaneously by the gear.

Implementations may include one or more of the following features. The locking structure where the mounting base may include a base cover with a center hole to allow an end section of the gear being extended out in a vertical direction of the mounting base and two guiding channels disposed one over another to allow the first sliding plate and the second sliding plate respectively to move linearly along a longitudinal direction of the mounting base with limitations to vertical or transverse motions. The locking structure may include a handle having inner threads configured to screw onto the end section of the gear that is extended out of the base cover. The locking structure may include a positioning shaft fixed to the mounting base, the positioning shaft fixing the handle and being sleeved by a torsion spring and inserted to the gear, the torsion spring may include a free end axially inserted into the gear and a fixed end connected to the positioning shaft.

Implementations may also include one or more of the following features. Each of the first latch and the second latch may include a lock case may include an inner cavity with an open end and a stop end, the inner cavity matching outer contour of each latch for facilitating sliding motion of respective one latch between the locking state and the unlocking state. Each of the first latch and the second latch may include a locking end to stretch out of the open end of the lock case in the locking state to limit the cover panel to the carriage side frame and retract fully into the lock case at the same time in the unlocking state to allow the cover panel being flipped up. The locking end of each of the first latch and the second latch may include a guiding surface configured to be pressed against respective one of the two carriage side frames to push the corresponding locking end back to the lock case as the cover panel is being deployed, the two locking ends stretching out of the respective lock cases again by resetting forces from the respective springs after the cover panel is fully laid flat on the two carriage side frames. Each of the first latch and the second latch may include a movable part connected to the locking end, the movable part being sleeved by a spring that abuts against the locking end and the stop end, the movable part pushing the locking end out of the open end of the lock case by a resetting force of the spring and pulling the locking end back in the lock case by compressing the spring.

Implementations may also include one or more of the following features. Each of the first latch and the second latch may include a connecting end located outside of the lock case, the connecting end being prevented from moving towards the open end of the lock case by the stop end in the locking state and being configured to retract the locking end back to the lock case in the unlocking state. The locking structure may include a first connector connecting the connecting end of the first latch to the first sliding plate and a second connector connecting the connecting end of the second latch to the second sliding plate to respectively provide two pulling forces respectively from the first end and the second end towards the gear in the middle to retract the locking end of each of the first latch and the second latch as the gear is rotated to cause linear motions of the first sliding plate and the second sliding plate in opposite direction.

It is to be appreciated that embodiments of the present invention provide many advantages over conventional techniques. Among other things, when the cover panels are in the expanded state, the lock tongue remains extended and cooperates with the frame of the carriage to lock the cover panel. By rotating the handle, the gear is driven to turn, which in turn drives the sliding plate to slide. The sliding plate pulls the connecting piece and retracts the lock tongue, thus unlocking the cover panel. After unlocking, the power for the lock tongue to reset is provided by the torsion spring on the gear and the spring on the lock tongue. At the same time, the engagement between the sliding plate and the gear toothed portion provides a certain buffering to avoid rapid rebound of the lock tongue and reduce the feedback of the handle to the hand, optimizing the operating feel. During this process, both ends of the sliding plate are subjected to reset forces, which is beneficial for improving the stability of the sliding plate movement and avoiding the gear toothed portion from getting stuck.

The present invention achieves these benefits and others in the context of known technology. However, a further understanding of the nature and advantages of the present invention may be realized by reference to the latter portions of the specification and attached drawings.

NUMERICAL INDICATORS FOR COMPONENTS IN FIGURES ABOVE

Figure 1:
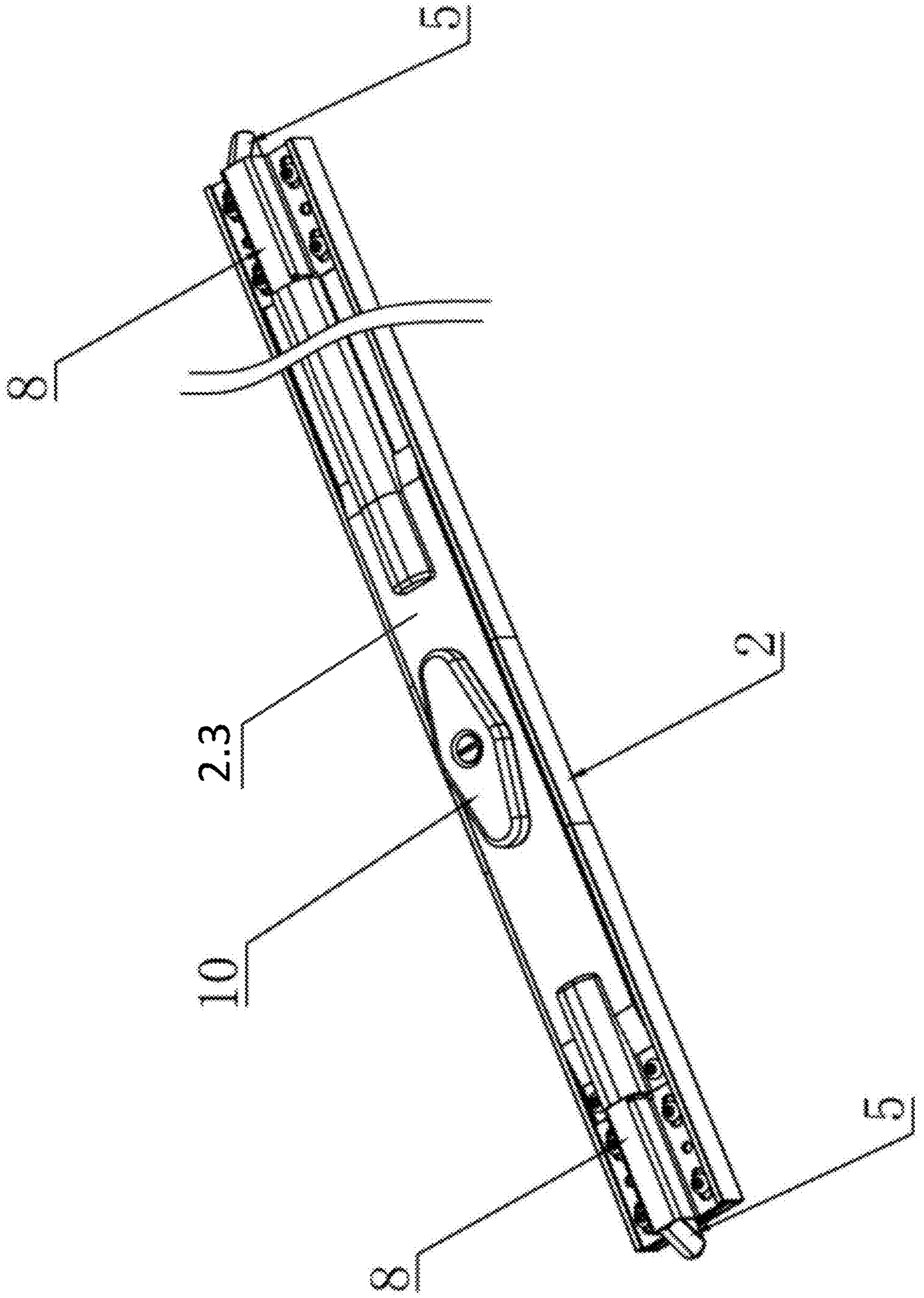
FIG. 1 is a perspective view of a locking structure for a carriage cover according to an embodiment of the present invention.

1: Cover panel; 2: Mounting base; 2.1: Guide channel, 2.2: Pressing edge; 2.3: Base cover.
3: Gear; 4: Sliding plate; 4.1: Toothed portion.
5: Latch; 5.1: Locking end; 5.2: Movable part; 5.3: Connecting end; 5.4: Guiding surface.
6: Positioning shaft; 7: Torsion spring; 8: Lock case; 8.1: Stop end.
9: Spring; 10: Handle; 11: Connector; 12: Carriage frame; 13: Mounting screw; 14: Nut.

DETAILED DESCRIPTION OF THE INVENTION

The present invention is directed to an apparatus with a locking structure for a movable cover of a vehicle carriage or open-type trunk. In a specific embodiment, the locking structure includes a gear rotatably mounted on a mounting base at the bottom of the cover panel, a sliding plate slidably mounted on the mounting base, and a latch slidably mounted on the bottom of the cover panel, the sliding plate being engaged with the gear via toothed portion on its inner side and the latch being connected to the sliding plate via a first connecting piece. There are other embodiments as well.

The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of embodiments. Thus, the present invention is not intended to be limited to the embodiments presented with references to the drawings, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the Claims herein is not intended to invoke the provisions of 35 U.S.C. 112, Paragraph 6.

Please note, if used, the labels left, right, front, back, top, bottom, side, one end, upper, middle, lower, close, near, away, forward, reverse, longitudinal, transverse, clockwise and counterclockwise have been used for convenience purposes only and are not intended to imply any particular fixed direction. Instead, they are used to reflect relative locations and/or directions between various portions of an object. These terms are only used to distinguish the components from each other for better understanding, rather than defining any directional or sequential limitations.

Figure 8:
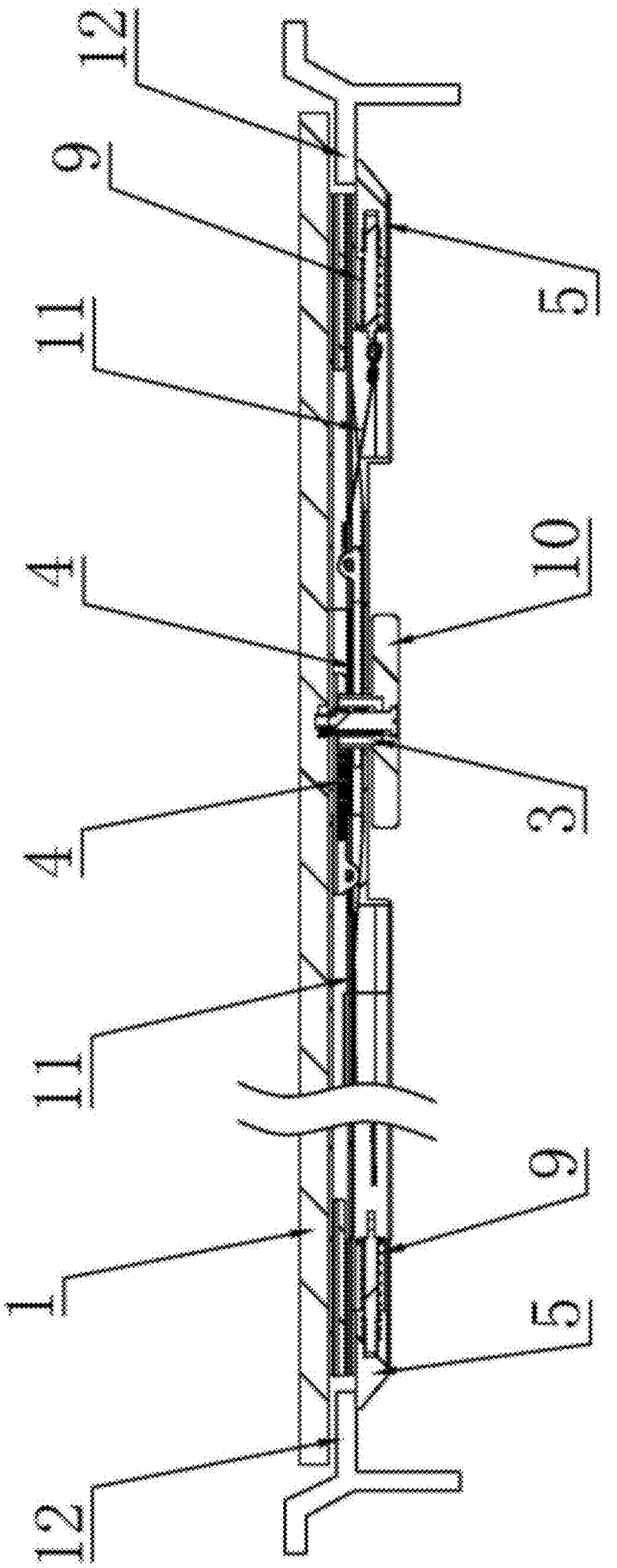
FIG. 8 is a cross-sectional view of the locking structure configured to lock the cover panel to carriage frames according to an embodiment of the present invention.

Typically, a vehicle carriage or car's open trunk has two side frames in length direction. A cover assembly, including multiple cover panels hinged together, can be provided to cover the carriage by laying each cover panel flat in a covering state. Alternatively, at least some cover panels of the cover assembly can be moveable and folded to set the carriage in an open state, while one cover panel near the end of the carriage may be fixed in the flat covering state. FIG. 1 is a perspective view of a locking structure for a carriage cover according to an embodiment of the present invention. FIG. 8 is a cross-sectional view of the locking structure configured to lock the cover panel to carriage frames according to an embodiment of the present invention. This diagram is merely an example, which should not unduly limit the scope of the claims. One of ordinary skill in the art would recognize many variations, alternatives, and modifications. In a specific embodiment, as shown in FIG. 8, a locking structure is provided to the bottom of a cover panel 1, which is laid flat in the covering state on the vehicle carriage, to lock the cover panel 1 with the carriage frames 12.

In the perspective view of FIG. 1, the locking structure includes a mounting base 2, that is configured to be fixed to the bottom of the cover panel 1, and two latches 5 being slidably stretched out of respective two lock cases 8 to lock the cover panel (i.e., prevent the cover panel from any vertical motion) to the two carriage side frames. Handle 10 is shown located above a base cover 2.3, which is used to control the sliding motion of the two latches 5 so that they can be retracted into the lock cases 8 to allow the cover panel 1 to be lifted upward away from the carriage side frames 12.

Figure 2:
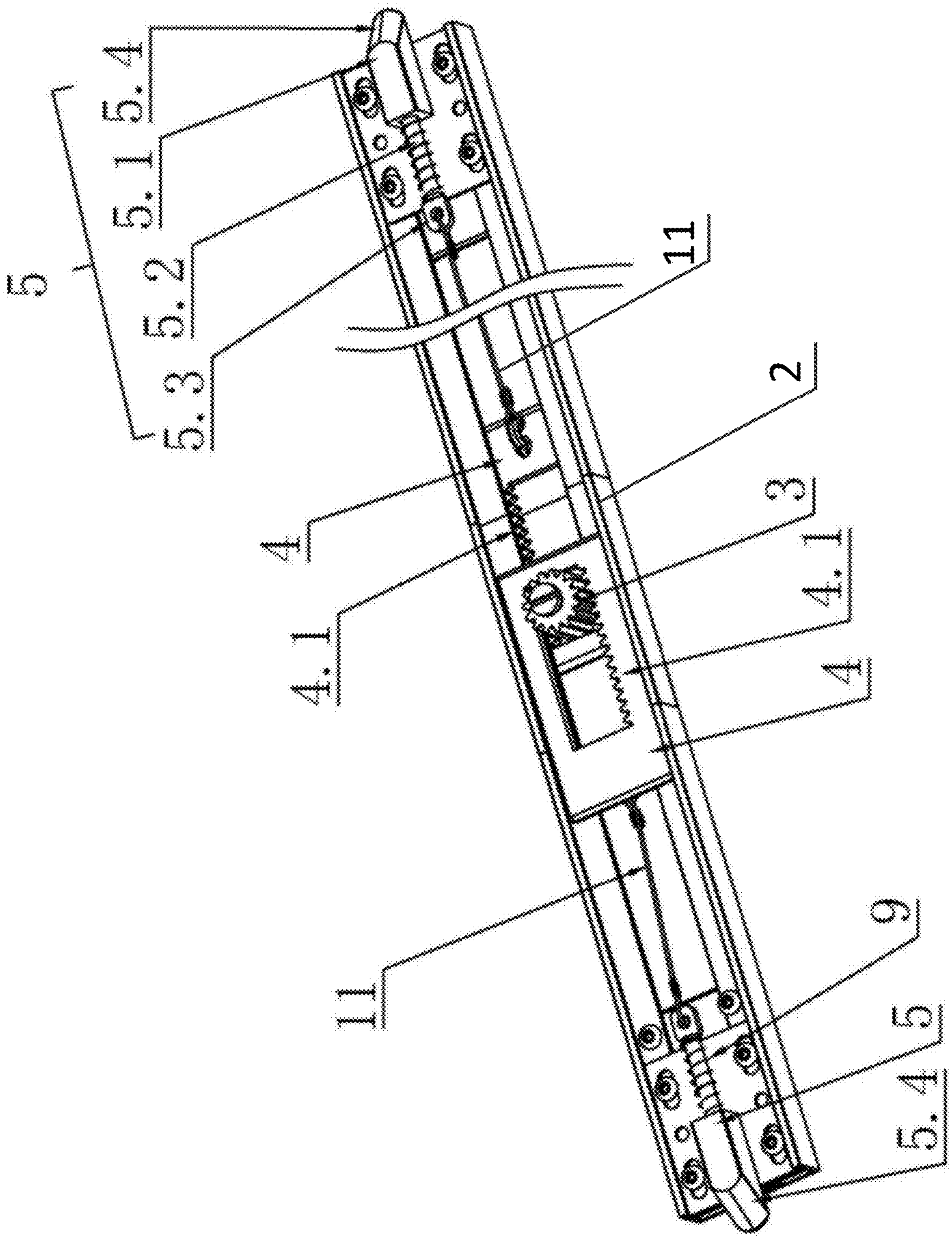
FIG. 2 is a perspective view of the locking structure of FIG. 1 with a base cover being removed according to the embodiment of the present invention.

FIG. 2 is a perspective view of the locking structure of FIG. 1 with a base cover 2.3 and lock cases 8 being removed according to the embodiment of the present invention. This diagram is merely an example, which should not unduly limit the scope of the claims. One of ordinary skill in the art would recognize many variations, alternatives, and modifications. In the embodiment, as shown in FIG. 2, the locking structure includes a gear 3 in cylinder shape rotatably arranged on the mounting base 2 and two sliding plates 4 slidably arranged on mounting base 2, both sliding plates 4 are partially stacked up and each includes an opened inner side equipped with toothed portion 4.1 that engage with gear 3 at different height level. Gear 3 is configured to serve as an actuator (controlled by the handle 10) for opening and closing the locking structure. Further, the locking structure includes two latches 5 slidably arranged on respective two ends of mounting base 2. The two latches 5 are arranged linearly along the mounting base 2 to connect to the two sliding plates 4 respectively via two connectors 11.

Additionally, as shown in FIG. 2, latch 5 includes a locking end 5.1 with a guiding surface 5.4, a movable part 5.2, and a connecting end 5.3. The locking end 5.1, of course, is the part of the latch 5 that extends out of the lock case to lock the cover panel with the carriage side frame 12 (see FIG. 8). The guiding surface 5.4 is used, as the cover panel 1 is deployed downward, to abut against the carriage side frame 12 and retract into the lock case 8, allowing the cover panel to be directly deployed to the flat covering state. The latch 5 then can be pushed out by resetting force of the spring 9 (and torsion spring 7) to complete the locking. Connecting end 5.3 is connected to the sliding plate 4 via connector 11. Movable part 5.2 uses a screw with spring 9 sleeved on to induce linear motion along the longitudinal direction of the mounting base 2. Based on the design, latch 5 has a locking state in which the locking end extends into the side frame 12 to restrict the flipping of the cover panel 1, and an unlocking state in which the gear 3 drives the sliding plate 4 to slide, causing the sliding plate 4 to retract the latch 5 into the lock case 8.

Figure 3:
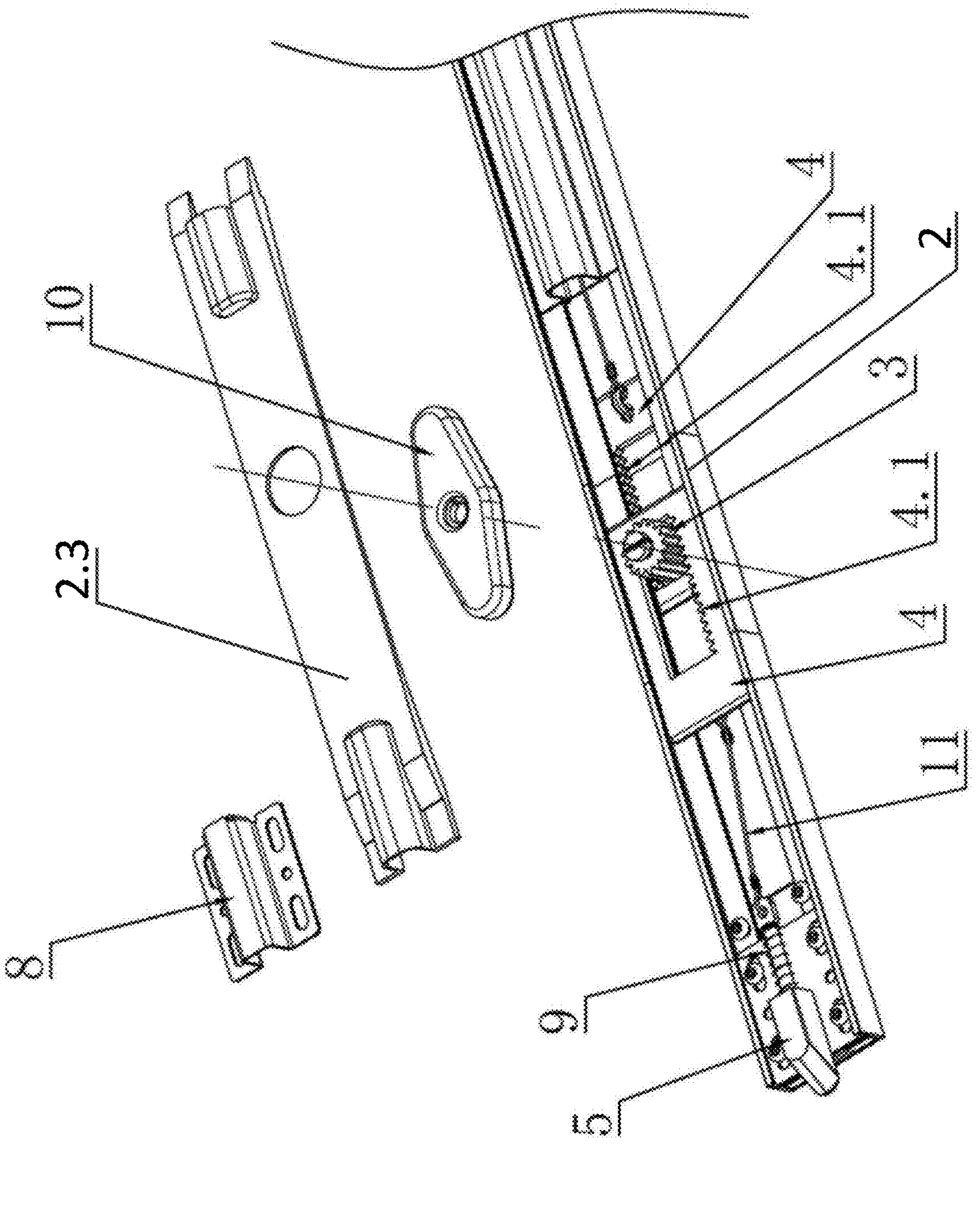
FIG. 3 is a partial exploded view of the locking structure of the cover assembly of FIG. 1 according to the embodiment of the present invention.

FIG. 3 is a partial exploded view of the locking structure of the cover assembly of FIG. 1 according to the embodiment of the present invention. This diagram is merely an example, which should not unduly limit the scope of the claims. One of ordinary skill in the art would recognize many variations, alternatives, and modifications. As shown in FIG. 3, lock case 8 is taken out to reveal the spring 9 sleeved on the movable part of the latch 5. Base cover 2.3 is also taken out to reveal the two sliding plates 4 linearly arranged along the mounting base 2. The sliding plate 4 includes toothed portion 4.1 on one of their inner side edge to engage with gear 3 in the center. Handle 10 is configured to have inner threads matching the gear 3 to allow handle 10 being screwed onto an end section of gear 3, after the base cover 2.3 is deployed, to drive its rotation, which translates to linear motion of the two sliding plates in two opposite directions along the mounting base 2.

Figure 4:
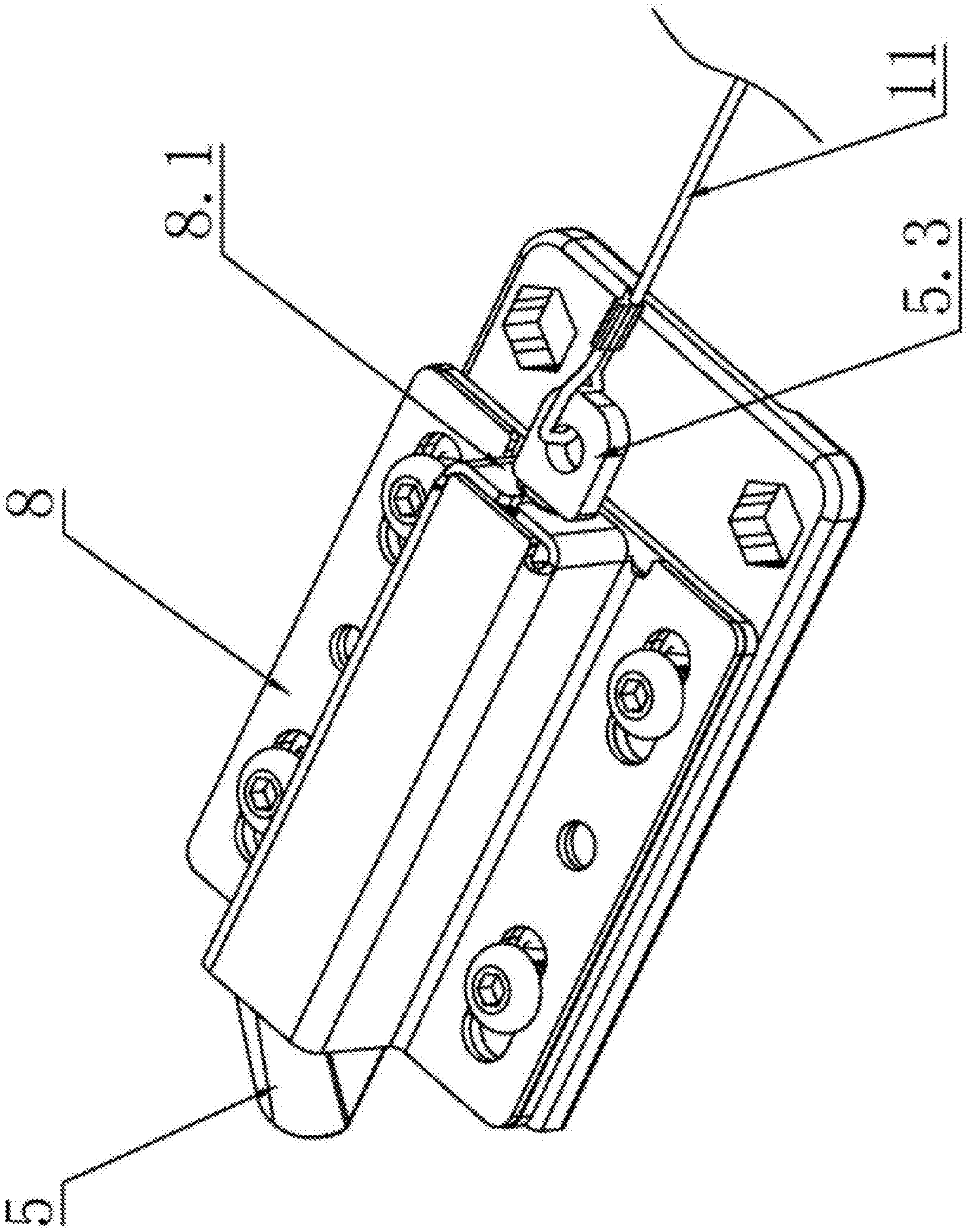
FIG. 4 is a perspective view of a latch of the locking structure according to the embodiment of the present invention.
Figure 5:
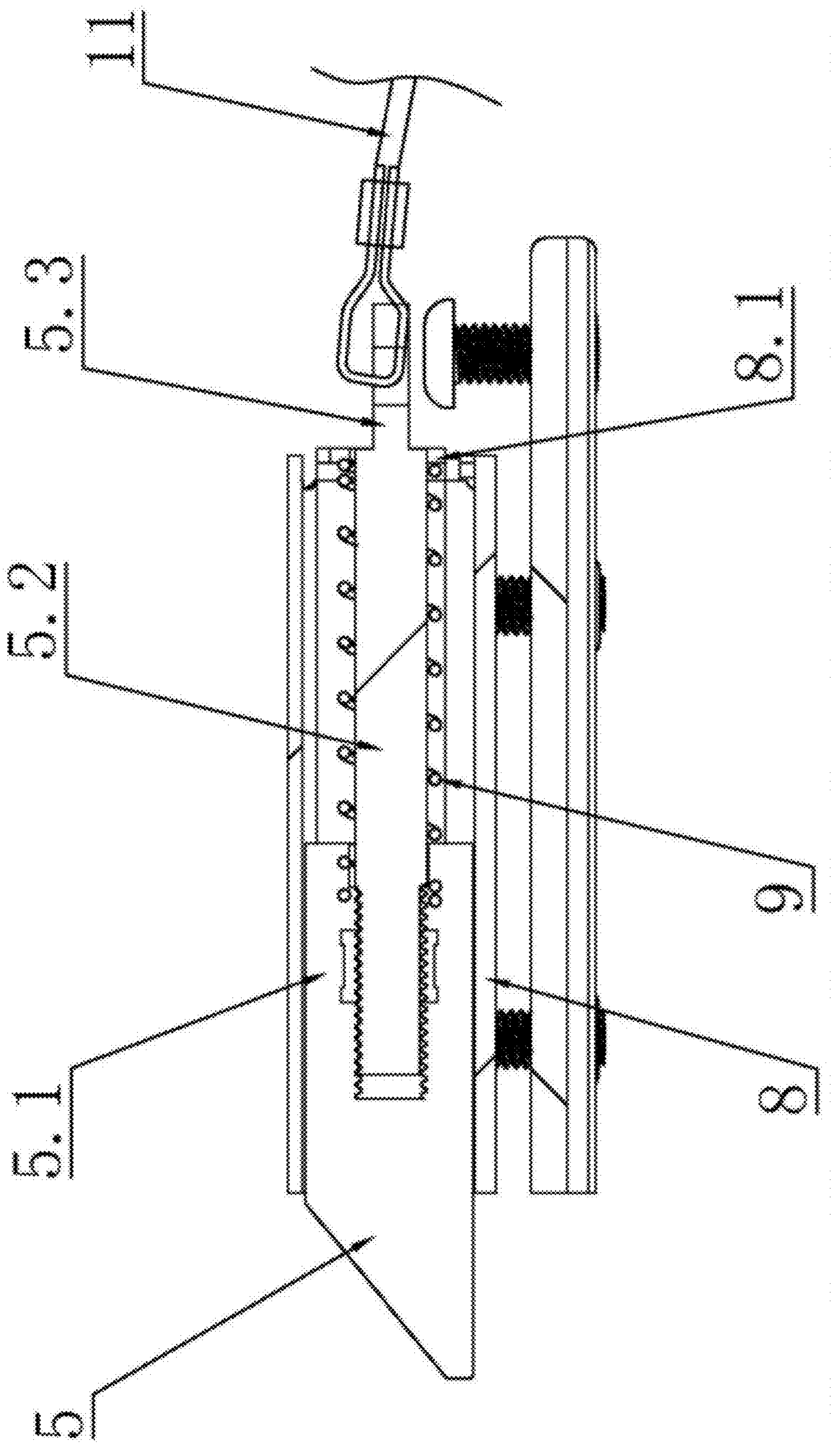
FIG. 5 is a cross-sectional view of the latch of FIG. 4 according to the embodiment of the present invention.

FIG. 4 is a perspective view of a latch of the locking structure according to the embodiment of the present invention. FIG. 5 is a cross-sectional view of the latch of FIG. 4 according to the embodiment of the present invention. These diagrams are merely examples, which should not unduly limit the scope of the claims. One of ordinary skill in the art would recognize many variations, alternatives, and modifications. As shown in FIG. 4, lock case 8 is deployed by several mounting screws. Specifically, lock case 8 has a back end including a stop end 8.1, which only allows the connecting end 5.3 to be left outside the lock case 8 while keeps the movable part and spring 9 inside the lock case 8. Lock case 8 has a front end (near the carriage side frame) being open. Latch 5 is configured to let its locking end 5.1 being stretched out by the resetting force of the spring 9. The connecting end 5.3 is connected to connector 11. In an example, connector 11 is provided by a metal robe with a sleeve hooked with a hole of the connecting end 5.3. Of course, connector 11 can be made in other forms that suit the mounting base structure. The same connector 11 also is connected to the sliding plate 4 (see FIG. 2). FIG. 5 just provides another view about the features of the latch of the locking structure described above.

Figure 6:
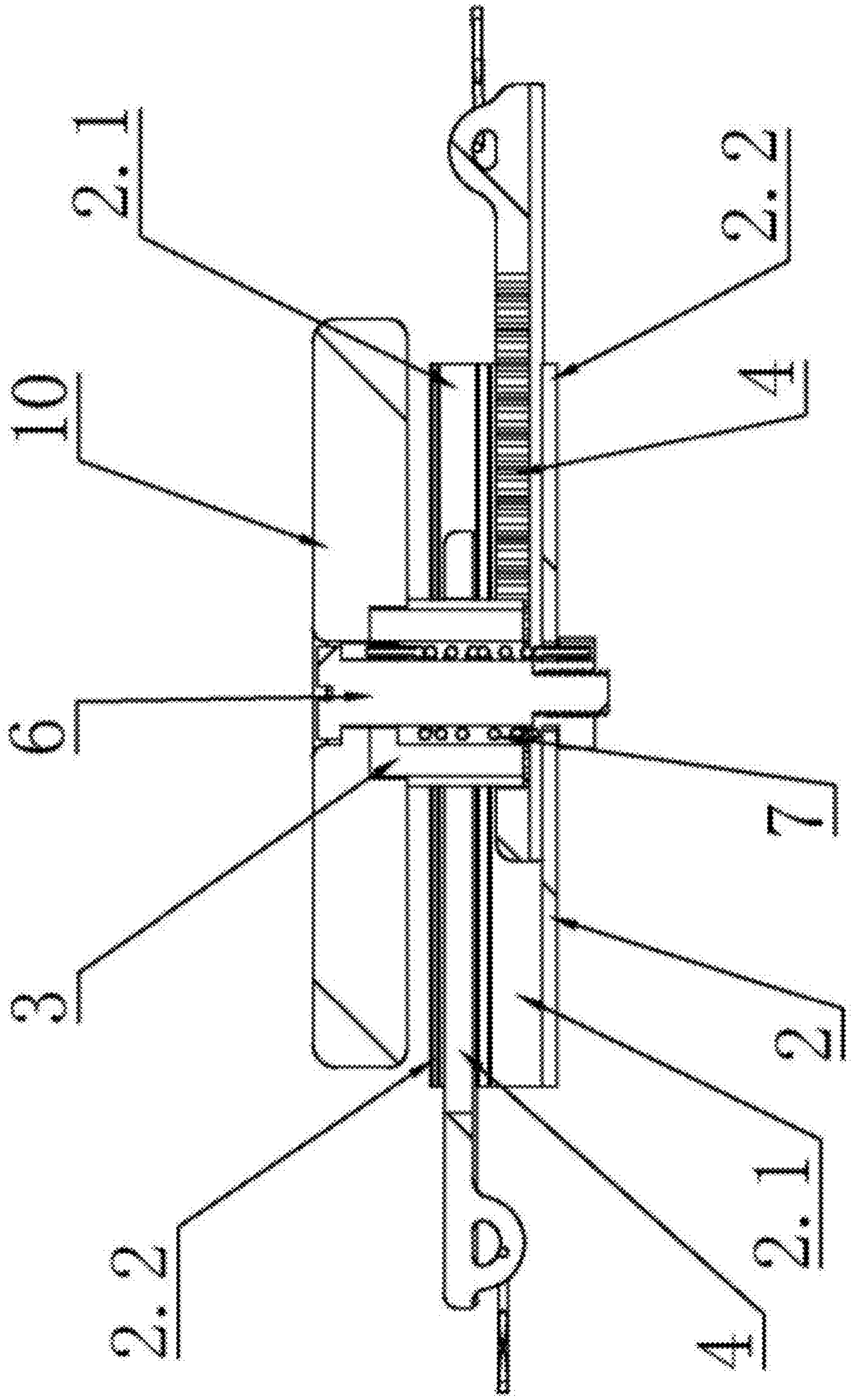
FIG. 6 is a cross-sectional view of a gear and sliding pate assembly of the locking structure in longitudinal direction according to an embodiment of the present invention.
Figure 7:
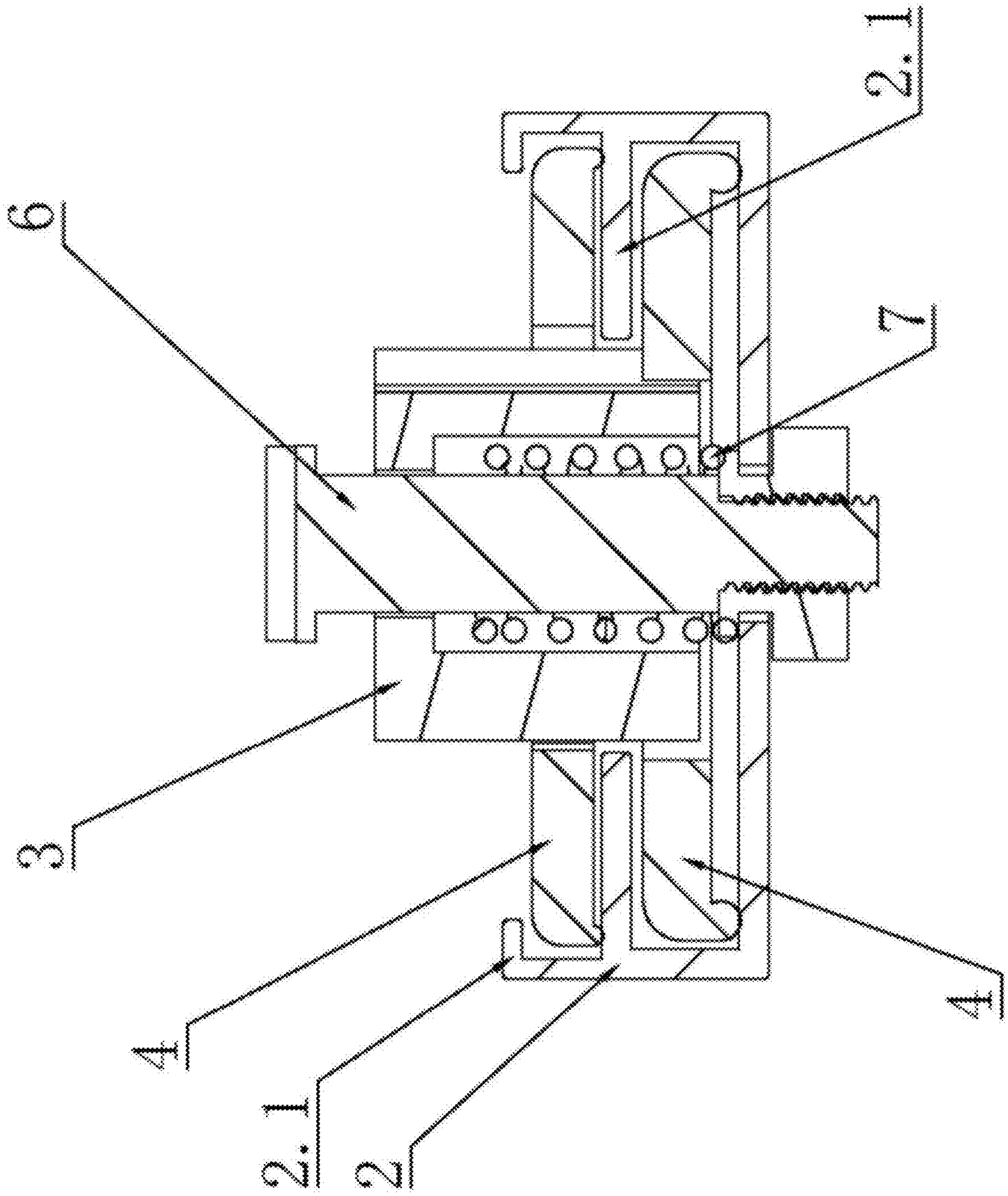
FIG. 7 is a cross-sectional view of the gear and sliding pate assembly of the locking structure in transverse direction according to an embodiment of the present invention.

FIG. 6 is a cross-sectional view of a gear and sliding pate assembly of the locking structure in longitudinal direction according to an embodiment of the present invention. FIG. 7 is a cross-sectional view of the gear and sliding pate assembly of the locking structure in transverse direction according to an embodiment of the present invention. These diagrams are merely examples, which should not unduly limit the scope of the claims. One of ordinary skill in the art would recognize many variations, alternatives, and modifications. In an embodiment, as shown in FIGS. 6 and 7, handle 10 is fixed by a positioning shaft 6 which is surrounded by a torsion spring 7 and passed through gear 3. As described in earlier sections, two sliding plates 4 are engaged with gear 3 via their toothed portion (not visible here), one plate is located above another and can move in opposite directions driven by rotating gear 3 along two guided channel 2.1. Each sliding plate 4 is connected via a connector 11 to a latch 5 in one end of the locking structure (see FIG. 2).

In some embodiments, to increase the stability of the sliding plate 4's movement, the sliding plate 4 is arranged in the mounting base 2 by an insertion method. A guide channel 2.1 for the sliding plate 4 to move is formed within the mounting base 2, and pressing edges 2.2 are formed on the upper and lower sides of the guide channel 2.1 to restrict the vertical movement of the sliding plate 4, ensuring its stable action within the mounting base 2.

In some embodiments, for resetting gear 3, positioning shaft 6 is fixed on the mounting base 2. A torsion spring 7 is sleeved on positioning shaft 6, and gear 3 is sleeved on positioning shaft 6, so that the torsion spring 7 is arranged between gear 3 and the positioning shaft 6. As shown in FIG. 6, a free end of the torsion spring 7 is axially inserted into a center hole of gear 3, and a fixed end of the torsion spring 7 is connected to positioning shaft 6. The main purpose of this improvement is to provide handle 10 with torque for resetting and rotating gear 3 by the torsion spring 7. After unlocking by using the handle 10 to drive gear 3 to rotate, the torsion spring 7 on gear 3 and the spring 9 on the latch 5 provide the power for resetting the latch 5. Meanwhile, the engagement of the sliding plates 4 and the toothed portion 4.1 on the gear 3 provides a certain buffer, preventing the latch 5 from quickly rebounding, reducing the feedback of the handle 10 on the hand, and optimizing the operation feel.

In some embodiments, during repositioning process of the latch 5, both the front and rear ends of the sliding plates 4 are subjected to the resetting force from the spring 9 and the torsion spring 7, which is beneficial for improving the stability of the sliding plates 4's movement and avoiding the toothed portion from getting stuck.

In the above embodiments, the latch 5 is covered with a lock case 8. The inner cavity of lock case 8 is matched with the outer contour of the latch 5 for sliding. One end of lock case 8 forms a stop end 8.1 while another end is opened. In the unlocked state, the latch 5 is limited by the stop end 8.1, and in the locked state, the latch 5 extends out of the open end of lock case 8. In the unlocked state, latch 5 is retracted into lock case 8. This improvement is mainly used to ensure the reliability of the latch 5 in the unlocked and locked states.

Referring to FIG. 5, for the resetting of latch 5, spring 9 is sleeved on the end of the latch 5. One end of the spring 9 abuts against the latch 5, and the other end abuts against the stop end 8.1 of lock case 8. This feature is mainly used to provide an independent reset force for the latch 5, thereby improving the smoothness of the latch 5's movement.

In some embodiments, the latch 5 includes a locking end 5.1, located at the front part of the latch 5 and cooperating with the frame 12. The contour of the locking end 5.1 is adapted to the inner contour of the lock case 8. In the unlocked state, the tail of the locking end 5.1 is limited by the stop end 8.1. Latch 5 also includes a movable part 5.2, located at the rear part of the latch 5 and passing through the lock case 8. The movable part 5.2 uses a screw, and the spring 9 is sleeved on the movable part 5.2. Latch 5 further includes a connecting end 5.3, located outside the lock case 8 and connected to the connector 11. In the locked state, the connecting end 5.3 abuts against the stop end 8.1.

Referring to FIGS. 3 and 6 again, for ease of operation, the gear 3 extends out of the mounting base 2 and is fitted with a handle 10. Handle 10 has a toothed inner cavity that matches gear 3.

In some embodiment, latch 5 additionally includes a guiding surface 5.4 formed on the locking end 5.1 for cooperating with the frame 12. After cover panel 1 is deployed, the guiding surface 5.4 abuts against the carriage side frame 12 and retracts into lock case 8, allowing the cover panel 1 to be directly deployed into its flat covering state. Then, with the resetting force of spring 9 and the torsion spring 7, the locking end reset to its stretched position to complete the locking.

As shown in FIG. 8, in some other embodiments, in order to increase the locking effect of the locking structure on the cover panel 1, two latches 5 are symmetrically arranged on both sides of the cover panel 1. The two sliding plates 4 can be arranged respectively on the upper and lower sides of gear 3 and mesh with it. The two sliding plates 4 are connected respectively to the two latches 5 through two connectors 11 in a one-to-one correspondence. The rotation of gear 3 drives the two sliding plates 4 to move relative to each other, allowing both latches 5 on both sides to be in the unlocking state simultaneously by turning the handle 10, making operation more convenient.

In a specific embodiment, the mounting base 2 is equipped with guiding channels 2.1 for arranging two sliding plates 4. The guiding channels 2.1 are arranged vertically and separately constrain the two sliding plates 4 to slide within them.

Figure 9:
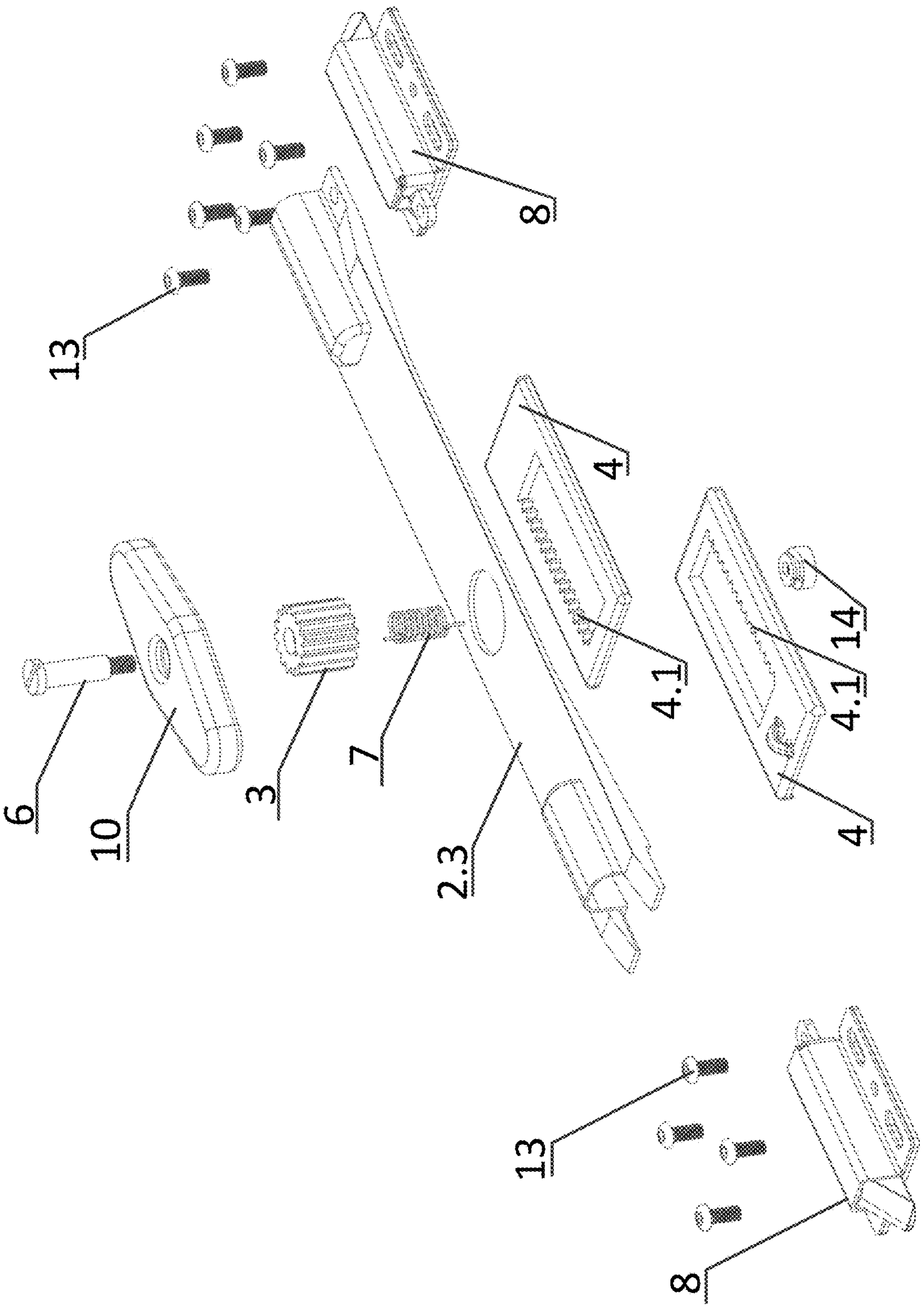
FIG. 9 is an exploded view of the locking structure of FIG. 1 without the mounting base according to an embodiment of the present invention.

FIG. 9 is an exploded view of the locking structure of FIG. 1 without the mounting base according to an embodiment of the present invention. This diagram is merely an example, which should not unduly limit the scope of the claims. One of ordinary skill in the art would recognize many variations, alternatives, and modifications. In another embodiment, as shown in FIG. 9, both the lock case 8 and base cover 2.3 are mounted to the mounting base (2) by multiple mounting screws 13. The base cover has a center hole allowing gear 3 to pass through and engage with two sliding plates 4, one above another. The sliding plate 4 at lower position has toothed portion 4.1 formed on one inner side to engage with gear 3. The sliding plate 4 at a higher position has toothed portion 4.1 formed on one inner side, that is opposed to the toothed portion side of the other sliding plate 4 at a lower position, to engage with gear 3 at the same time during locking/unlocking operations. The torsion spring 7 is inserted into center hole of gear 3 to sleeve positioning shaft 6. Positioning shaft 6 has a threaded end that is fixed from below the sliding plate 4 (separated by a pressing edge 2.2) by a nut 14 after the locking structure is assembled. The free end of torsion spring 7 is axially placed inside gear 3. The fixed end of the torsion spring 7 is connected to positioning shaft 6. Handle 10 is configured to screwed onto an end section of gear 3 to drive the gear 3 rotation which causes the sliding plates 4 to move linearly in opposite directions along the mounting base (2) to control the motion of latch 5.

Figure 10:
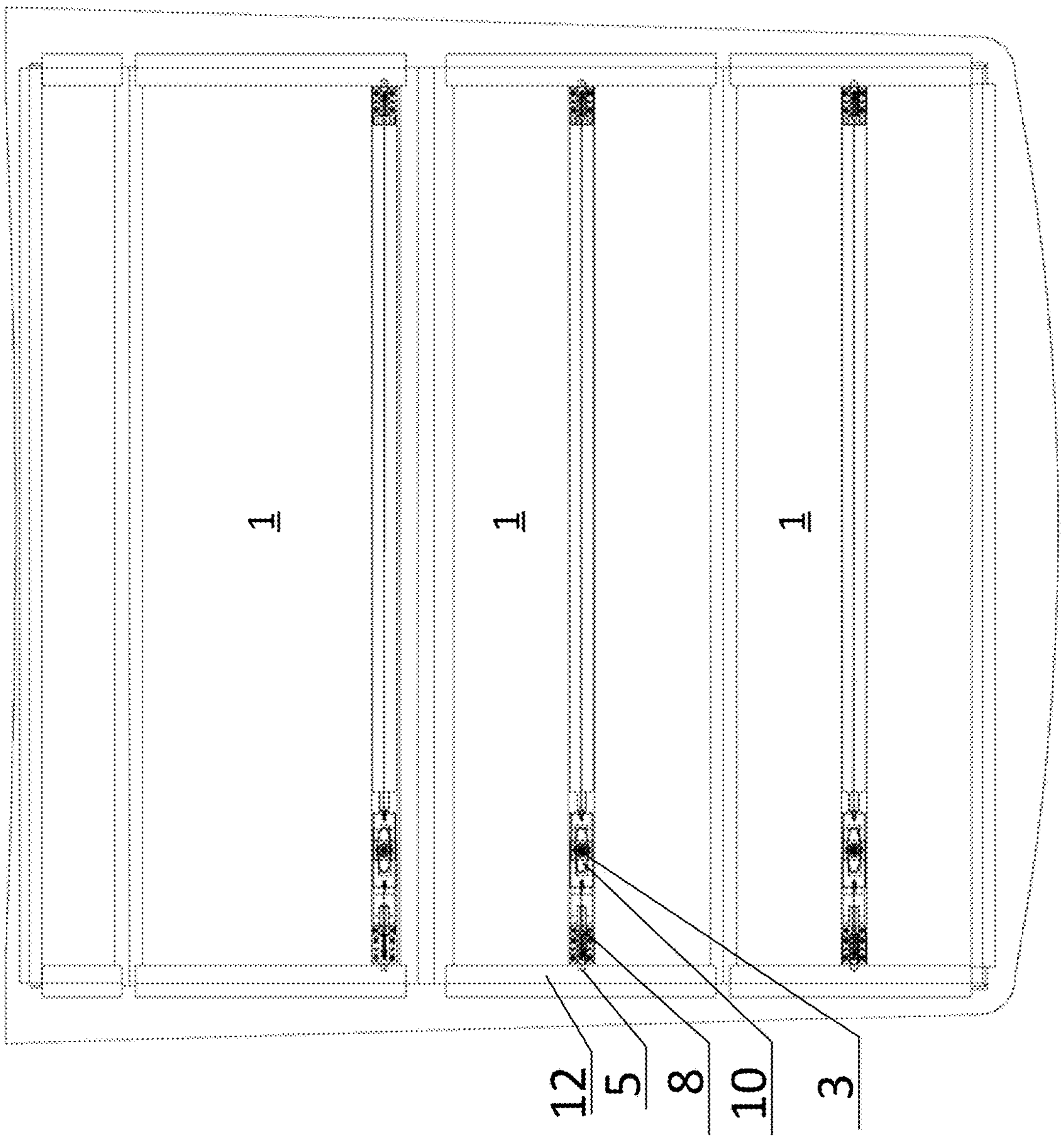
FIG. 10 is a bottom view of several carriage cover panels being laid flat and each cover panel being locked by the locking structure according to an embodiment of the present invention.

FIG. 10 is a bottom view of several carriage cover panels being laid flat and each cover panel being locked by the locking structure according to an embodiment of the present invention. This diagram is merely an example, which should not unduly limit the scope of the claims. One of ordinary skill in the art would recognize many variations, alternatives, and modifications. In some embodiments, as shown in FIG. 10, the locking structure according to the present disclosure is mounted to backside of each carriage cover panel 1. FIG. 10 shows all cover panels are laid flat (from a folded open state) with their side edges being supported on carriage frame 12. Each cover panel 1 in the flat cover state is operably locked by the lock structure on both edges. This is achieved by firstly operating handle 10 through gear 3 (e.g., rotating handle 10 in clockwise direction) to pull both latch 5 inwards into corresponding lock case 8 on each side to allow the locking structure in a position below the side edge of the carriage frame 12. Secondly, by operating handle 10 again (e.g., rotating in counterclockwise direction) through gear 3 to release latch 5 outwards from the lock case 8 on both sides to allow them to be extended below the carriage frame 12, the cover panel 1 is now in a locked state as the latch 5 is blocked by carriage frame 12 to prevent cover panel 1 from vertical motions. Each cover panel 1 for the carriage cover assembly has its own locking structure and can be locked independently. By reversing the operation steps mentioned above, each cover panel 1 can be released from the locking state and one by one sequentially be folded to open the carriage. Overall, these locking structures ensure carriage cover panels are in a secure flat cover state associated with carriage frame and provide a simple way to release the locking state to allow the cover panels be folded in an open state.

While the above is a full description of the specific embodiments, various modifications, alternative constructions and equivalents may be used. Therefore, the above description and illustrations should not be taken as limiting the scope of the present invention which is defined by the appended claims.

What is claimed is:

1. A locking structure for locking a cover panel to a carriage side frame comprising:
- a mounting base fixed to bottom surface of the cover panel;
- a gear rotatably arranged on the mounting base;
- a first sliding plate slidably arranged on the mounting base, the first sliding plate comprising an inner opening with a side edge having a first toothed portion engaged with the gear;
- a second sliding plate slidably arranged on the mounting base, the second sliding plate comprising an inner opening with a side edge having a second toothed portion engaged with the gear, the second sliding plate being partially stacked over the first sliding plate along a vertical direction of the mounting base such that the first and second sliding plates are configured to engage with the gear at different height levels; and
- a latch slidably arranged to an end region of the mounting base and connected to the first sliding plate, the latch comprising a locking state stretching out of the end region to lock the cover panel to the carriage side frame and an unlocking state retracting back to the mounting base by the sliding motion of the first sliding plate driven by the gear;
- wherein the mounting base comprises a guiding channel formed within the mounting base and extending along a longitudinal direction of the mounting base, the first sliding plate is constrained to linear movement within the guiding channel.

2. The locking structure of claim 1 wherein the mounting base comprises a base cover with a center hole to allow an end section of the gear being extended out in the vertical direction of the mounting base.

3. The locking structure of claim 2 further comprising a handle having inner threads configured to screw onto the end section of the gear that is extended out of the base cover.

4. The locking structure of claim 3 further comprising a positioning shaft fixed to the mounting base, the positioning shaft fixing the handle and being sleeved by a torsion spring and inserted to the gear, the torsion spring comprising a free end axially inserted into the gear and a fixed end connected to the positioning shaft.

5. The locking structure of claim 1 wherein the latch comprises a lock case comprising an inner cavity with an open end and a stop end, the inner cavity matching outer contour of the latch for facilitating sliding motion of the latch between the locking state and the unlocking state.

6. The locking structure of claim 5 wherein the latch comprises a locking end to stretch out of the open end of the lock case in the locking state to limit the cover panel to the carriage side frame and retract fully into the lock case in the unlocking state to allow the cover panel being flipped up.

7. The locking structure of claim 6 wherein the locking end comprises a guiding surface configured to be pressed against the carriage side frame to push the locking end back to the lock case as the cover panel is being deployed, the locking end stretching out of the lock case again by a resetting force from the spring after the cover panel is fully laid flat on the carriage side frame.

8. The locking structure of claim 5 wherein the latch comprises a movable part connected to the locking end, the movable part being sleeved by a spring that abuts against the locking end and the stop end, the movable part pushing the locking end out of the open end of the lock case by a resetting force of the spring and pulling the locking end back in the lock case by compressing the spring.

9. The locking structure of claim 5 wherein the latch comprises a connecting end located outside of the lock case, the connecting end being prevented from moving towards the open end of the lock case by the stop end in the locking state and being configured to retract the locking end back to the lock case in the unlocking state.

10. The locking structure of claim 1, further comprising pressing edges formed on upper and lower sides of the guiding channel to restrict vertical movement of the first and second sliding plates.

11. A locking structure for locking a cover panel to two carriage side frames comprising:

a mounting base fixed at bottom of the cover panel, the mounting base comprising a length from a first end to a second end across a width of the cover panel from a first side edge to a second side edge thereof;

a gear rotatably arranged near a middle region of the mounting base;

a first sliding plate slidably arranged on the mounting base, the first sliding plate comprising an inner opening with a side edge having a first toothed portion engaged with the gear;

a second sliding plate slidably arranged on the mounting base, the second sliding plate comprising an inner opening with a side edge having a second toothed portion engaged with the gear, the second sliding plate being partially stacked over the first sliding plate along a vertical direction of the mounting base such that the first and second sliding plates are configured to engage with the gear at different height levels, and the second tooth portion being located near opposite edges of the mounting base; and a first latch slidably arranged at the first end of the mounting base and connected to the first sliding plate; and a second latch slidably arranged at the second end of the mounting base and connected to the second sliding plate;

wherein the first latch and the second latch comprising a locking state where the first latch stretches out of the first end and the second latch stretches out the second end to lock the first side edge and the second side edge of the cover panel respectively to the two carriage side frames, and an unlocking state where both the first latch and the second latch are retracted back to the mounting base by linear motion in opposite directions of the first sliding plate and the second sliding plate driven simultaneously by the gear;

wherein the mounting base comprises a guiding channel formed within the mounting base and extending along a longitudinal direction of the mounting base, the first and second sliding plates are constrained to linear movement within the guiding channel.

12. The locking structure of claim 11 wherein the mounting base comprises a base cover with a center hole to allow an end section of the gear being extended out in the vertical direction of the mounting base.

13. The locking structure of claim 12 further comprising a handle having inner threads configured to screw onto the end section of the gear that is extended out of the base cover.

14. The locking structure of claim 13 further comprising a positioning shaft fixed to the mounting base, the positioning shaft fixing the handle and being sleeved by a torsion spring and inserted to the gear, the torsion spring comprising a free end axially inserted into the gear and a fixed end connected to the positioning shaft.

15. The locking structure of claim 11 wherein each of the first latch and the second latch comprises a lock case comprising an inner cavity with an open end and a stop end, the inner cavity matching outer contour of each latch for facilitating sliding motion of respective one latch between the locking state and the unlocking state.

16. The locking structure of claim 15 wherein each of the first latch and the second latch comprises a locking end to stretch out of the open end of the lock case in the locking state to limit the cover panel to the carriage side frame and retract fully into the lock case at the same time in the unlocking state to allow the cover panel being flipped up.

17. The locking structure of claim 16 wherein the locking end of each of the first latch and the second latch comprises a guiding surface configured to be pressed against respective one of the two carriage side frames to push the corresponding locking end back to the lock case as the cover panel is being deployed, the two locking ends stretching out of the respective lock cases again by resetting forces from the respective springs after the cover panel is fully laid flat on the two carriage side frames.

18. The locking structure of claim 15 wherein each of the first latch and the second latch comprises a movable part connected to the locking end, the movable part being sleeved by a spring that abuts against the locking end and the stop end, the movable part pushing the locking end out of the open end of the lock case by a resetting force of the spring and pulling the locking end back in the lock case by compressing the spring.

19. The locking structure of claim 15 wherein each of the first latch and the second latch comprises a connecting end located outside of the lock case, the connecting end being prevented from moving towards the open end of the lock case by the stop end in the locking state and being configured to retract the locking end back to the lock case in the unlocking state.

20. The locking structure of claim 19 further comprising a first connector connecting the connecting end of the first latch to the first sliding plate and a second connector connecting the connecting end of the second latch to the second sliding plate to respectively provide two pulling forces respectively from the first end and the second end towards the gear in the middle to retract the locking end of each of the first latch and the second latch as the gear is rotated to cause linear motions of the first sliding plate and the second sliding plate in opposite direction.

* * * * *